Sept. 15, 1942. A. F. SANDERS 2,296,192
COMBUSTION CHAMBER
Filed July 1, 1940

Inventor
Arthur F. Sanders
by Mawhinney & Mawhinney
Attorneys.

Patented Sept. 15, 1942

2,296,192

UNITED STATES PATENT OFFICE 2,296,192

COMBUSTION CHAMBER

Arthur Freeman Sanders, Leeds, England, assignor to John Fowler & Co. (Leeds) Limited, Leeds, England Application July 1, 1940, Serial No. 343,490
In Great Britain May 25, 1939

8 Claims. (Cl. 123—32)

This invention relates to fuel-injection engines, such as may operate entirely by compression ignition or may alternatively be provided with a separate ignition means to assist or replace compression ignition.

It is well known that the completeness of combustion in such an engine depends, among other things, upon the state of turbulence of the compressed gaseous charge immediately before and after fuel injection has taken place. In practice, before maximum combustion of air is obtained there appears, in the exhaust gases, first a haze and then black smoke, the latter increasing in density until the maximum power is attained.

Our main object is to defer the appearance of haze and black smoke in the exhaust gases as far as possible until the production of maximum power.

According to the invention the engine has in its compression space two cavities each of which is of relatively compact form, one (hereinafter referred to in the main as the injection cavity) in which injection takes place, and the other (hereinafter referred to in the main as the reception cavity) in which there is no injection. The cavities are arranged to be adjacent one another at the top dead centre position of the piston, and each of them communicates with the cylinder bore, at the bottom dead centre position of the piston, through an opening of substantially no axial length. Moreover, at the bottom dead centre position of the piston the injection cavity communicates either with the cylinder bore or, alternately, jointly with the cylinder bore and with the reception cavity through a port of substantially no axial length and of less cross-section than the mean parallel cross-section of the injection cavity, the ratios of these cross-sections preferably being between the limits of 0.64 and 0.25. The reception cavity communicates, at the top dead centre position of the piston, with the injection cavity through an aperture of substantially no axial length and of less cross-section than the mean parallel cross-section of the reception cavity. The reception cavity is overhung by the under-surface of the injection cavity, at the top dead centre position of the piston, round the major portion of its periphery, the overhanging under-surface presenting an acute-angled edge to the said port. In consequence the reception cavity directly receives the first rush of the flaming charge from the injection cavity.

It is preferable that the centres of the areas of the said port and said aperture are not coincident.

Measured from the under-surface of the injection cavity at in-centre the volume of the reception cavity is preferably between 0.33 and 0.125 of the total compression space, and its mean depth in a direction parallel to the piston axis is preferably between $\frac{1}{12}$ and $\frac{1}{4}$ of the piston stroke. Moreover, the reception cavity is conveniently of substantially rectangular cross-section in planes parallel to the piston axis. For example, it may be of cylindrical form, or of the form of a cylinder truncated by a parallel cylinder, i. e., of crescent form.

The injection cavity is preferably in the form of a truncated sphere, the ratio of the diameter of the said port to the diameter of the sphere then being between 0.8 and 0.5. (This corresponds to cross-sectional ratios of between 0.64 and 0.25.) When the injection cavity is of truncated spherical form, and the reception cavity is of cylindrical form, or of truncated cylindrical form as above mentioned, the centres of the sphere, the cylinder and the said port are preferably in a line parallel to the piston axis.

It is to be preferred that the said cavities should provide the whole of the compression space at the top dead centre position of the piston except for the clearance spaces which are necessary for mechanical reasons. Alternatively, if desired, the engine may be provided, for each cylinder, with two or more pairs of such cavities.

Figures 1, 2, 3, 4, 5, 6:
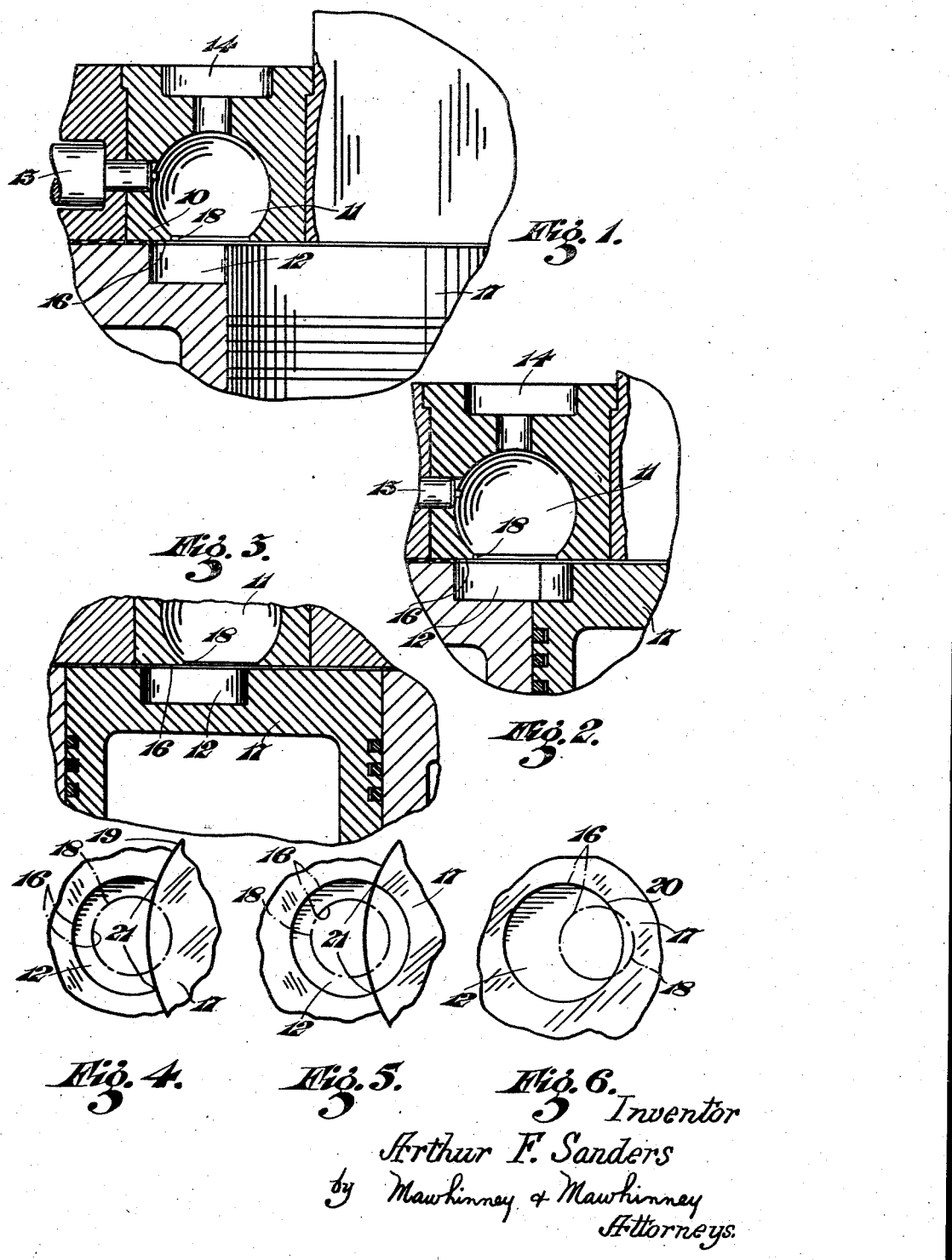
Figure 1 is a fragmentary sectional elevation through the cylinder and combustion chamber of an engine according to the invention.
Figures 2 and 3 are similar views showing alternative constructions.
Figure 4 is a fragmentary plan of the cylinder-block of Figure 1 with the cylinder-head removed, but showing the said port having substantially no axial length in chain lines.
Figures 5 and 6 are corresponding views as regards Figures 2 and 3, respectively.

It may here be mentioned that the construction of Figure 1 bears a resemblance to that of Figures 1 and 2 of U. S. patent specification No. 2,096,527, but the latter does not have the projecting ledge 10 of Figure 1 hereof, as a result of which the operation of the present engine is improved.

In all the constructions illustrated, 11 represents the injection chamber and 12 the reception chamber, 13 indicating a fuel-injection nozzle and 14 an opening for a starting-igniter, or for a sparking-plug when compression-ignition is to be assisted (or replaced) by separate ignition means.

The most satisfactory form for the injection cavity to take is that of a truncated sphere, such cavity being placed wholly in the cylinder-head. As shown in the constructions of Figures 1 and 2, it may be materially offset from the piston axis (having its centre at a greater distance from the piston axis than the radius of the cylinder bore) or, as shown in the construction of Figure 3, it may have its centre on or near the piston axis.

The reception cavity 12 has a volume which is between 0.33 and 0.125 of the total compression space. It is preferably mainly rectangular in cross-section in planes parallel to the piston axis. For example, it may either be of full cylindrical form, with its axis parallel to the piston axis, as shown in the constructions of Figures 2 and 3, or of cylindrical form truncated by a cylinder—i. e., crescent-shaped, as shown in the construction of Figure 1. The depth of the reception cavity in a direction parallel to the piston axis is between $\frac{1}{12}$ and $\frac{1}{4}$ of the piston stroke. In each case, it will be observed, the reception cavity is wholly or partly encaved or over-hung by the under-floor 16 of the injection cavity, at the top dead centre position of the piston 17. This overhanging under-floor presents a circular edge 18 which is acute-angled and extends round the major portion of the periphery of the reception cavity, and entirely round it in the construction of Figure 2. The gaseous charge in the reception cavity will be in some form of vortex motion at the moment that it is subjected to the inrush of the flaming charge from the injection cavity.

In all the constructions illustrated the piston 17 approaches the cylinder-head at the top dead centre position of the piston with the minimum of clearance which is necessary for mechanical reasons, so that the two cavities provide the whole of the compression space except for the clearance space. Obviously, if desired, however, there may be associated with each cylinder two or more sets of such cavities.

At the top dead centre position of the piston the two cavities communicate with one another through an aperture of substantially no axial length. In the construction of Figure 1, this aperture is represented in plan view—as shown by Figure 4—by the circle 18 less the segment thereof cut off by the arc 19 (of the piston circumference). In the construction of Figure 2 the aperture in plan view (see Figure 5) is represented by the circle 18. In that of Figure 3 the aperture in plan view (see Figure 6) is the part which is common to the two circles 18 and 20, the latter numeral denoting the circular outline of the reception cavity of the construction of Figure 3. The cross-section of this said aperture (in plan view) is less than the cross-section of the reception cavity perpendicular to the piston axis, and is also less than the mean cross-section of the injection cavity.

Having fixed upon the volumetric size of the reception cavity, the injection cavity is arranged to be of such size as to give the required compression ratio. In this connection it may be observed that in many cases it is desirable that the engine should work with a relatively-low compression ratio, i. e., with an injection cavity of relatively large volume, the engine being supplied with a pre-compressed charge.

At the bottom dead centre position of the piston the injection cavity communicates partly with the reception cavity and partly with the cylinder bore in the constructions of Figures 1 and 2 and only with the cylinder bore in that of Figure 3 through the said port bounded by the circular edge 18, the diameter of this port being to the diameter of the injection cavity sphere between the limits of 0.8 and 0.5.

Furthermore, at the bottom dead centre position of the piston the two cavities, in the constructions of Figures 1 and 2, jointly communicate with the cylinder bore through an opening of substantially no axial length and bounded partly by part of the edge 18 and partly by the junction of the reception cavity and cylinder bore as shown by the arc 21 in Figures 4 and 5. In the construction of Figure 3 the two cavities individually communicate with the cylinder bore in the above conditions through their respective openings.

In Figures 1 and 3 the line through the centres of volume of the two cavities is not coincident with or parallel to the piston axis. In Figure 2 it is parallel to the piston axis. In the construction of Figure 1, the centre of the sphere, of the port 18 of substantially no axial length, and of the cylinder truncated by the cylinder bore to provide the reception cavity, are on a line parallel to the piston axis.

On injection and ignition occurring in the injection cavity the rush of flaming charge into the reception cavity interferes with the or some vortex motion set up therein during the compression stroke and sets up a state of intense and largely-confused turbulence therein, such as is very favourable to the rapid and complete combustion of the fuel and oxygen.

What I claim as my invention and desire to secure by Letters Patent of the United States is:

1. A fuel-injection engine having parts comprising a cylinder head, a cylinder block providing a cylinder bore, and a piston reciprocable within said cylinder bore, said parts providing two cavities forming part of the compression space of the engine, each of said cavities being of relatively-compact form, one cavity being an injection cavity into which fuel is injected and the other being a reception cavity in which no fuel injection occurs, the cavities being adjacent one another at the top dead centre position of the piston, and each of them communicating with the cylinder bore, at the bottom dead centre position of the piston, through an opening of substantially no axial length, said injection cavity opening through a port of substantially no axial length of less cross-section than the mean cross-section of said injection cavity in a direction parallel to the plane of said port, and said reception cavity communicating, at the top dead centre position of the piston, with said injection cavity through an aperture of substantially no axial length and of less cross-section than the mean parallel cross-section of said reception cavity, whereby said reception cavity is overhung by the under-surface of said injection cavity, at the top dead centre position of the piston, around the major portion of its periphery, and said overhanging under-surface being arranged to present an acute-angled edge to said port.

2. A fuel-injection engine having parts comprising a cylinder head, a cylinder block providing a cylinder bore, and a piston reciprocable within said cylinder bore, said parts providing two cavities forming part of the compression space of the engine, each of said cavities being of relatively-compact form, one cavity being an injection cavity into which fuel is injected and the other being a reception cavity in which no fuel injection occurs, the cavities being adjacent one another at the top dead centre position of the piston, and each of them communicating with the cylinder bore, at the bottom dead centre position of the piston, through an opening of substantially no axial length, said injection cavity opening through a port of substantially no axial length and of less cross-section than the mean cross-section of said injection cavity in a direction parallel to the plane of said port, and said reception cavity communicating, at the top dead centre position of the piston, with said injection cavity through an aperture of substantially no axial length of less cross-section than the mean parallel cross-section of said reception cavity, whereby said reception cavity is overhung by the under-surface of said injection cavity, at the top dead centre position of the piston, around the major portion of its periphery, said port and apertures being relatively displaced from the piston axis so that the centres of their areas are not coincident, and said overhanging under-surface being arranged to present an acute-angled edge to said port.

3. A fuel-injection engine having parts comprising a cylinder head, a cylinder block providing a cylinder bore, and a piston reciprocable within said cylinder bore, said parts providing two cavities forming part of the compression space of the engine, each of said cavities being of relatively-compact form, one cavity being an injection cavity into which fuel is injected and the other being a reception cavity in which no fuel injection occurs, the cavities being adjacent one another at the top dead centre position of the piston, and each of them communicating with the cylinder bore, at the bottom dead centre position of the piston, through an opening of substantially no axial length, said injection cavity opening through a port of substantially no axial length and of less cross-section than the mean cross-section of said injection cavity in a direction parallel to the plane of said port, said reception cavity having a volume of between 0.33 and 0.125 of the total compression space and having a depth in a direction parallel to the piston axis between $\frac{1}{12}$ and $\frac{1}{4}$ of the piston stroke, and said reception cavity communicating, at the top dead centre position of the piston, with said injection cavity through an aperture of substantially no axial length and of less cross-section than the mean parallel cross-section of said reception cavity, whereby said reception cavity is overhung by the under-surface of said injection cavity, at the top dead centre position of the piston, around the major portion of its periphery, and said overhanging under-surface being arranged to present an acute-angled edge to said port.

4. A fuel-injection engine having parts comprising a cylinder head, a cylinder block providing a cylinder bore, and a piston reciprocable within said cylinder bore, said parts providing two cavities forming part of the compression space of the engine, each of said cavities being of relatively-compact form, one cavity being an injection cavity into which fuel is injected and the other being a reception cavity in which no fuel injecton occurs, the cavities being adjacent one another at the top dead centre position of the piston, and each of them communicating with the cylinder bore, at the bottom dead centre position of the piston, through an opening of substantially no axial length, said injection cavity opening through a port of substantially no axial length and of less cross-section than the mean cross-section of said injection cavity in a direction parallel to the plane of said port, said reception cavity being of substantially rectangular cross-section in planes parallel to the piston axis and preferably being of cylindrical-like form, and said reception cavity communicating, at the top dead centre position of the piston, with said injection cavity through an aperture of substantially no axial length and of less cross-section than the mean cross-section of said reception cavity perpendicular to the piston axis, whereby said reception cavity is overhung by the under-surface of said injection cavity, at the top dead centre position of the piston, around the major portion of its periphery, and said overhanging under-surface being arranged to present an acute-angled edge to said port.

5. A fuel-injection engine having parts comprising a cylinder head, a cylinder block providing a cylinder bore, and a piston reciprocable within said cylinder bore, said parts providing two cavities forming part of the compression space of the engine, each of said cavities being of relatively-compact form, one cavity being an injection cavity into which fuel is injected and the other being a reception cavity in which no fuel injection occurs, the cavities being adjacent one another at the top dead centre position of the piston, and each of them communicating with the cylinder bore, at the bottom dead centre position of the piston, through an opening of substantially no axial length, said injection cavity opening through a port of substantially no axial length and of less cross-section than the mean cross-section of said injection cavity in a direction parallel to the plane of said port, the ratio of the area of said port to said mean cross-section being between 0.64 and 0.25, and said reception cavity communicating, at the top dead centre position of the piston, with said injection cavity through an aperture of substantially no axial length and of less cross-section than the mean parallel cross-section of said reception cavity, whereby said reception cavity is overhung by the under-surface of said injection cavity, at the top dead centre position of the piston, around the major portion of its periphery, and said overhanging under-surface being arranged to present an acute-angled edge to said port.

6. A fuel-injection engine having parts comprising a cylinder head, a cylinder block providing a cylinder bore, and a piston reciprocable within said cylinder bore, said parts providing two cavities forming part of the compression space of the engine, each of said cavities being of relatively-compact form, one cavity being an injection cavity into which fuel is injected and the other being a reception cavity in which no fuel injection occurs, the cavities being adjacent one another at the top dead centre position of the piston, and each of them communicating with the cylinder bore, at the bottom dead centre position of the piston, through an opening of substantially no axial length, said injection cavity being in the form of a truncated sphere opening through a port of substantially no axial length and of less cross-section than the mean cross-section of said injection cavity in a direction parallel to the plane of said port, the ratio of the diameter of said port to that of said sphere being between 0.8 and 0.5, and said reception cavity communicating, at the top dead centre position of the piston, with said injection cavity through an aperture of substantially no axial length and of less cross-section than the mean parallel cross-section of said reception cavity, whereby said reception cavity is overhung by the under-surface of said injection cavity, at the top dead centre position of the piston, around the major portion of its periphery, and said overhanging under-surface being arranged to present an acute-angled edge to said port.

7. A fuel-injection engine having parts comprising a cylinder head, a cylinder block providing a cylinder bore, and a piston reciprocable within said cylinder bore, said parts providing two cavities forming the whole of the compression space of the engine except for the clearance spaces which are necessary for mechanical reasons, one cavity being an injection cavity into which fuel is injected, said injection cavity being of truncated spherical shape, said cavity being disposed in the cylinder head with its centre nearly in line with the wall of the cylinder bore, and the other cavity being a reception cavity in which no fuel injection occurs, said reception cavity being disposed in the cylinder block adjacent the truncated opening of said injection cavity and being of the shape of a cylinder truncated by the piston bore, the axis of said cylinder being parallel to the piston axis, and said reception cavity communicating with said injection cavity through an aperture of substantially no axial length and of less cross-section than the mean parallel cross-section of said reception cavity, whereby said reception cavity is overhung by the under-surface of said injection cavity around the major portion of its periphery, and said overhanging under-surface being arranged to present an acute-angled edge.

8. A fuel injection engine having parts comprising a cylinder head, a cylinder block providing a cylinder bore, and a piston reciprocable within said cylinder bore, said parts providing two cavities forming part of the compression space of the engine, each of said cavities being of relatively compact form, one cavity being an injection cavity into which fuel is injected and the other being a reception cavity in which no fuel injection occurs, the cavities being adjacent one another at the top dead centre position of the piston, said cavities communicating with the cylinder bore at the bottom dead centre position of the piston, through an opening of substantially no axial length, said injection cavity opening through a port of substantially no axial length and of less cross section than the mean cross section of said injection cavity in a direction parallel to the plane of said port, and said reception cavity communicating, at the top dead centre position of the piston, with said injection cavity through an aperture of substantially no axial length and of less cross section than the mean parallel cross section of said reception cavity, whereby said reception cavity is overhung by the under surface of said injection cavity, at the top dead centre position of the piston, around the major portion of its periphery, and said overhanging under surface being arranged to present an acute angle to said port at a point remote from the cylinder axis.

ARTHUR F. SANDERS.